(12) United States Patent
Chen et al.

(10) Patent No.: US 9,799,117 B2
(45) Date of Patent: Oct. 24, 2017

(54) METHOD FOR PROCESSING DATA AND APPARATUS THEREOF

(71) Applicant: Lenovo (Beijing) Co., Ltd., Beijing (CN)

(72) Inventors: Ke Chen, Beijing (CN); Manjun Xiao, Beijing (CN); Wenjing Liu, Beijing (CN); Chen Yang, Beijing (CN); Rongyao Fu, Beijing (CN); Qian Ma, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 203 days.

(21) Appl. No.: 14/459,872

(22) Filed: Aug. 14, 2014

(65) Prior Publication Data

US 2015/0092016 A1 Apr. 2, 2015

(30) Foreign Application Priority Data

Sep. 30, 2013 (CN) .......................... 2013 1 0462302
Dec. 25, 2013 (CN) .......................... 2013 1 0729189
Dec. 27, 2013 (CN) .......................... 2013 1 0741722

(51) Int. Cl.
*H04N 15/00* (2006.01)
*H04N 13/02* (2006.01)
(Continued)

(52) U.S. Cl.
CPC ............ *G06T 7/0057* (2013.01); *G01B 11/25* (2013.01); *G06T 7/521* (2017.01); *G06T 7/55* (2017.01)

(58) Field of Classification Search
CPC ...................................... G01B 11/25
(Continued)

(56) References Cited

U.S. PATENT DOCUMENTS 7,532,332 B2 5/2009 Gomercic et al.
9,046,355 B2 6/2015 Takabayashi et al.
(Continued)

FOREIGN PATENT DOCUMENTS

CN 1508514 A 6/2004
CN 1632451 A 6/2005
(Continued)

OTHER PUBLICATIONS

First Chinese Office Action regarding Application No. 201310729189.3 dated Feb. 20, 2017. English translation provided by Unitalen Attorneys at Law.
(Continued)

*Primary Examiner* — Hung Dang
*Assistant Examiner* — Girumsew Wendmagegn
(74) *Attorney, Agent, or Firm* — Harness, Dickey & Pierce, P.L.C.

(57) ABSTRACT

A method for processing data and an apparatus thereof are provided. The method includes: projecting a first structure light and a second structure light onto a surface of a target object, wherein the first structure light is a stripe-structure light; capturing a first image comprising the target object; detecting first image information corresponding to the first structure light in the first image, wherein the first image information is stripe image information; detecting second image information corresponding to the second structure light in the first image; and obtaining a depth of the target object based on the first image information and the second image information.

12 Claims, 10 Drawing Sheets

(51) Int. Cl.
*G06T 7/00* (2017.01)
*G01B 11/25* (2006.01)
*G06T 7/521* (2017.01)
*G06T 7/55* (2017.01)

(58) Field of Classification Search
USPC .............................. 348/46; 356/603; 382/154
See application file for complete search history.

(56) References Cited

U.S. PATENT DOCUMENTS

| | | | |
|---|---|---|---|
| 2006/0072122 A1 | 4/2006 | Hu et al. | |
| 2006/0244977 A1 | 11/2006 | Gomercic et al. | |
| 2011/0317878 A1 | 12/2011 | Kang et al. | |
| 2012/0089364 A1 | 4/2012 | Takabayashi | |
| 2012/0092680 A1* | 4/2012 | Teodorescu | G01B 11/2509 356/625 |
| 2012/0133954 A1 | 5/2012 | Takabayashi et al. | |
| 2013/0293700 A1 | 11/2013 | Yang | |
| 2015/0092016 A1 | 4/2015 | Chen et al. | |
| 2015/0092049 A1 | 4/2015 | Chen et al. | |

FOREIGN PATENT DOCUMENTS

| | | |
|---|---|---|
| CN | 1766522 A | 5/2006 |
| CN | 1865847 A | 11/2006 |
| CN | 101281024 A | 10/2008 |
| CN | 101794461 A | 8/2010 |
| CN | 102073050 A | 5/2011 |
| CN | 102472613 A | 5/2012 |
| CN | 103322937 A | 9/2013 |
| CN | 103400366 A | 11/2013 |
| CN | 104751414 A | 7/2015 |
| JP | 2012093235 A | 5/2012 |
| WO | WO-2012002152 A1 | 1/2012 |

OTHER PUBLICATIONS

First Chinese Office Action regarding Application No. 201310741722.8 dated Mar. 17, 2017. English translation provided by Unitalen Attorneys at Law.
First Chinese Office Action regarding Application No. 201310462302.6 dated Mar. 28, 2017. English translation provided by Unitalen Attorneys at Law.

* cited by examiner

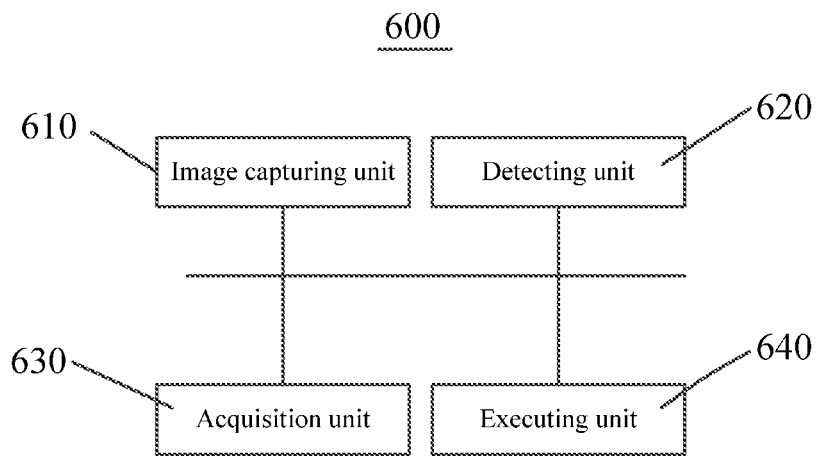

Figure 6

- in a case that stripe-structure lights are projected onto a target object by a stripe-structure light source, a first image on a projecting plane is formed after the stripe structure lights are reflected by the target object, stripe image information corresponding to F stripe lights distributed on the target object is acquired — 701

- F positions of the F stripe lights are determined based on the stripe image information corresponding to the F stripe lights — 702

- a depth of the target object is determined based on the F positions of the F stripe lights — 703

Figure 7

METHOD FOR PROCESSING DATA AND APPARATUS THEREOF

CROSS-REFERENCES TO RELATED APPLICATIONS

The present application claims the priority to Chinese Patent Application No. 201310462302.6, entitled "METHOD FOR PROCESSING IMAGE AND APPARATUS THEREOF", filed on Sep. 30, 2013 with the Chinese State Intellectual Property Office, and Chinese Patent Application No. 201310729189.3, entitled "METHOD FOR PROCESSING DATA AND ELECTRONIC DEVICE", filed on Dec. 25, 2013 with the Chinese State Intellectual Property Office, and Chinese Patent Application No. 201310741722.8, entitled "METHOD FOR PROCESSING INFORMATION AND ELECTRONIC DEVICE", filed on Dec. 27, 2013 with the Chinese State Intellectual Property Office which are incorporated herein by reference in its entirety.

FIELD

The present invention relates to the technical field of electronic technology, and in particular to a method for processing data and an apparatus thereof.

BACKGROUND

Three-dimension scanning is a high-tech integrating the technologies of optics, machinery, electricity and computer, mainly configured to scan a space shape, a structure and a color of an object to obtain space coordinates of a surface of the object. Three-dimension scanning is widely applied to various fields such as industry, medical treatment, education, cultural relic protecting, etc. The significance of three-dimension scanning lies on the capability of transforming the three-dimensional information of an entity to the digital signal which can be processed by computer, which provides an effective manner of digitizing entity.

By an optical three-dimension scanning system, stripe lights with a same interval and a same width are projected onto a surface of an object, an image is captured synchronously by a camera, and then the image may be calculated. Three-dimensional space coordinates (X, Y, Z) of the two images may be realized by means of phase steady polar, such that a measurement of a three-dimension profile of the surface of the object may be realized.

The deeper the object is, the bigger the deflection of the stripe image corresponding to the stripe light in the image captured by the camera may be. When recognizing the stripe image with a big deflection in the image, malposed or incorrect reorganization may occur, thereby effecting a depth recovery of the three-dimension image of the object.

SUMMARY

According to the embodiments of the present invention, it is provided a method for processing data and an apparatus thereof.

The method for processing data includes:
projecting a first structure light and a second structure light onto a surface of a target object, where the first structure light is a stripe-structure light;
capturing a first image comprising the target object;
detecting first image information corresponding to the first structure light in the first image, wherein the first image information is stripe image information;
detecting second image information corresponding to the second structure light in the first image; and
obtaining a depth of the target object based on the first image information and the second image information.

Optionally, a width of the second structure light is different from a width of the first structure light.

Optionally, obtaining a depth of the target object based on the first image information and the second image information includes:
obtaining a sequence and positions of the first structure lights and the second structure lights based on the first image information and the second image information; and
obtaining the depth of the target object based on the sequence and the positions of the first structure lights and the second structure lights.

Optionally, obtaining a sequence and positions of the first structure lights and the second structure lights based on the first image information and the second image information includes:
recognizing, from the first image information and the second image information, primary stripe image information corresponding to the first structure light and reference stripe image information corresponding to the second structure light; and
determining the sequence of the primary stripe lights based on the reference stripe image information and the primary stripe image information and obtaining the positions of the primary stripe lights and the at least two reference stripe lights.

Optionally, in a case that the at least two reference stripe lights comprise M first reference stripe lights and N second reference stripe lights, the first reference stripe lights and the second reference stripe lights have different widths, and M and N are integers greater than or be equal to 1, obtaining a sequence and positions of the first structure lights and the second structure lights based on the first image information and the second image information includes:
recognizing, from the first image information and the second image information, the primary strip image information corresponding to the primary stripe lights, first reference stripe image information corresponding to the M first reference stripe lights and second reference stripe image information corresponding to the N second reference stripe lights.

Optionally, obtaining the sequence of the primary stripe lights based on the reference stripe image information and the primary stripe information includes:
determining a sequence of the second reference stripe lights based on the first reference stripe image information; and
determining the sequence of the primary stripe lights based on the second reference stripe image information.

Optionally, the second structure light is a centrosymmetric pattern light.

Optionally, the centrosymmetric pattern are set at a same interval on a stripe of the first structure light, wherein the pattern is configured to recognize the first structure light, and the patterns of any two adjacent first structure lights are different.

Optionally, the second structure light is a dot-structure light.

Optionally, projecting a first structure light and a second structure light onto a surface of a target object includes:

forming a plurality of stripe lights on the surface of the target object and forming a plurality of dot lights between the stripe lights.

Optionally, the method further includes:

capturing a reference image including the stripe lights and dot lights.

Optionally, obtaining a depth of the target object based on the first image information and the second image information includes:

calculating a first depth of each stripe light in the first image based on image information of the each stripe light in the reference image and the image information of the each stripe light in the first image;

calculating a second depth of each dot light in the first image based on image information of the each dot light in the reference image and the image information of the each dot light in the first image; and obtaining a depth of the target object based on the first depth of the each stripe light in the first image and the second depth of the each dot light in the first image.

Optionally, calculating a first depth of each stripe light in the first image includes: calculating the first depth of a center of the each stripe light in the first image.

Optionally, calculating a first depth of each stripe light in the first image based on image information of the each stripe light in the reference image and the image information of each stripe light in the first image includes:

matching the each stripe light in the first image with the each stripe light in the reference image to obtain a plurality of matching pairs of stripe lights, wherein each of the matching pairs of the stripe lights comprises a target stripe light in the first image and a reference stripe light in the reference image;

calculating, for each of the matching pairs of stripe lights, a first parallax of the target stripe light relative to the reference stripe light based on the image information of the target stripe light and the reference stripe light in the matching pair of stripe lights; and calculating the first depth of the target stripe light in the first image based on the first parallax.

Optionally, calculating a second depth of each dot light in the first image based on image information of the each dot light in the reference image and the image information of the each dot light in the first image includes:

matching the each dot light in the first image with the each dot light in the reference image to obtain a plurality of matching pairs of the dot lights, wherein each of the matching pairs of the dot lights comprises a first dot light in the first image and a second dot light in the reference image;

calculating, for each of the matching pairs of the dot lights, a second parallax of the first dot light relative to the second dot light based on image information of the first dot light and the second dot lights in the matching pair of the dot lights; and calculating a second depth of the first dot light in the first image based on the second parallax.

Optionally, matching the each dot light in the first image with the each dot light in the reference image includes:

determining, for any adjacent first target stripe light and second target stripe light in the first image, a first reference stripe light and a second reference stripe light matched respectively with the first target stripe light and the second target stripe light in the reference image;

obtaining, for a target dot light between the first target stripe light and the second target stripe light in the first image, a matched reference dot light from the dot lights between the first reference stripe light and the second reference stripe light in the reference image and obtaining the matching pair of the dot lights.

The apparatus for processing data includes:

an image capturing unit, configured to capture a first image comprising a target object in a case that a first structure light and a second structure lights are projected onto a surface of the target object;

a detecting unit, configured to detect first image information corresponding to the first structure light in the first image and detect second image information corresponding to the second structure light in the first image, wherein the first image information is stripe image information;

an executing unit, configured to obtain a depth of the target object based on the first image information and the second image information.

Optionally, a width of the second structure light is different from a width of the first structure light, wherein the apparatus further includes:

an acquisition unit, configured to acquire a sequence and positions of the first structure lights and the second structure lights based on the first image information and the second image information;

where the executing unit is configured to obtain the depth of the target object based on the sequence and the positions of the first structure lights and the second structure lights.

Optionally, the acquisition unit is further configured to recognize, from the first image information and the second image information, primary stripe image information corresponding to the first structure light and reference stripe image information corresponding to the second structure light;

and determine the sequence of the primary stripe lights based on the reference stripe image information and the primary stripe image information and obtain the positions of the primary stripe lights and the at least two reference stripe lights.

Optionally, the image capturing unit is further configured to capture a reference image comprising the stripe lights and dot lights in a case that the second structure light is a dot-structure light.

Optionally, the executing unit includes:

a first depth calculating unit, configured to calculate a first depth of stripe light in the first image based on image information of the each stripe light in the reference image and the image information of the each stripe light in the first image;

a second depth calculating unit, configured to calculate a second depth of each dot light in the first image based on image information of the each dot light in the reference image and the image information of the each dot light in the first image;

a depth image generating unit, configure to obtain a depth of the target object based on the first depth of the each stripe light in the first image and the second depth of the each dot light in the first image.

Optionally, the first depth calculating unit includes:

a central depth calculating unit, configured to calculate the first depth of a center of the each stripe light in the first image based on the image information of the stripe light in the reference image and in the first image.

Optionally, the first depth calculating unit includes:

a first matching unit, configured to match the each stripe light in the first image with the each stripe light in the reference image to obtain a plurality of matching pairs of stripe lights, wherein each of the matching pairs of the stripe lights comprises a target stripe light in the first image and a reference stripe light in the reference image;

a first parallax calculating unit, configured to calculate, for each of the matching pairs of stripe lights, a first parallax of the target stripe light relative to the reference stripe light based on the image information of the target stripe light and the reference stripe light in the matching pair of stripe lights; and a first depth calculating unit, configured to calculate a first depth of the target stripe light in the first image based on the first parallax.

Optionally, the second depth calculating unit includes:

a second matching unit, configured to match each dot light in the first image with the each dot light in the reference image to obtain a plurality of matching pairs of the dot lights, wherein each of the matching pairs of the dot lights comprises a first dot light in the first image and a second dot light in the reference image;

a second parallax calculating unit, configured to calculate, for each of the matching pairs of the dot lights, a second parallax of the first dot light relative to the second dot light based on image information of the first dot light and the second dot light in the matching pair of the dot lights; and a second depth calculating sub-unit, configured to calculate a second depth of the first dot light in the first image based on the second parallax.

Optionally, the second matching unit includes:

a stripe matching determining unit, configured to determine, for any adjacent first target stripe light and second target stripe light in the first image, a first reference stripe light and a second reference stripe light matched respectively with the first target stripe light and the second target stripe light in the reference image;

a second matching sub-unit, configured to obtain, for a target dot light between the first target stripe light and the second target stripe light in the first image, a matched reference dot light from the dot lights between the first reference stripe light and the second reference stripe light in the reference image, and obtain the matching pair of the dot lights.

BRIEF DESCRIPTION OF THE DRAWINGS

FIG. 6 is schematic structure diagram of an apparatus for processing data provided according to Embodiment 6 of the invention;

FIG. 7 is a flowchart showing a method for processing data provided according to Embodiment 8 of the invention;

DETAILED DESCRIPTION

The technical solutions according to the embodiments of the invention will be specified in conjunction with the drawings. Obviously, the disclosed embodiments are a few of the embodiments of the invention, rather than all of the embodiments. Other embodiments obtained by those skilled in the art without creative work based on the embodiments of the invention, fall into the scope of the invention.

Embodiment 1

A method for processing data and an apparatus thereof are provided according to the embodiments of the invention, which solve the technical issue in the conventional technology that a malposed recognition or a misrecognition may occur in the process of recognizing a stripe image corresponding to a stripe light in an image in a case that the stripe lights are projected onto an object with a great depth, and an accuracy of a depth measurement of a three-dimension image of the object.

Figure 1:
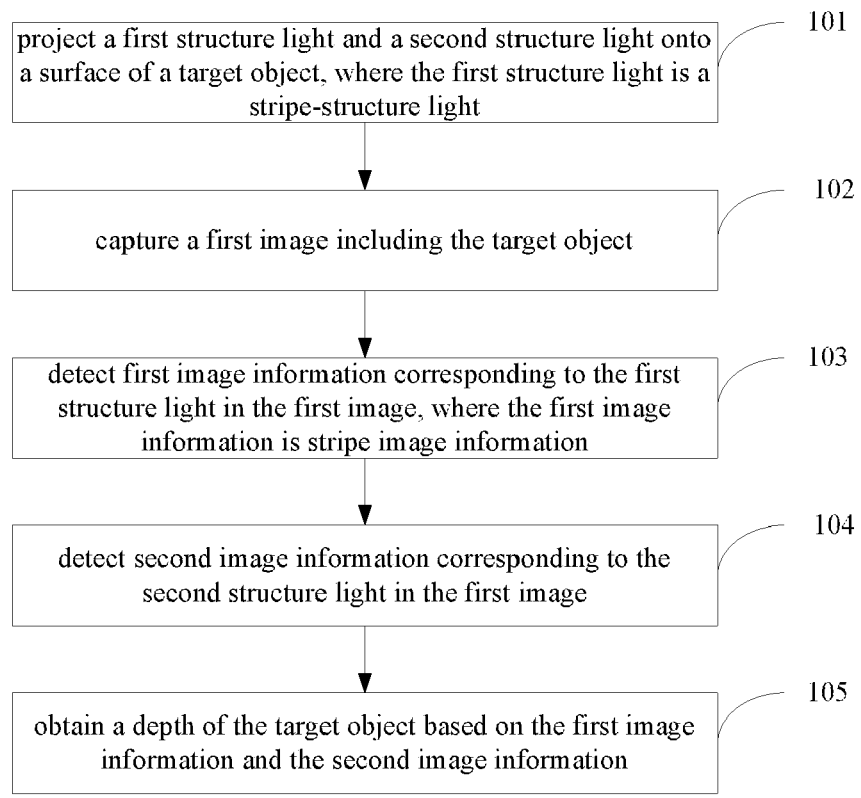
FIG. 1 is a flowchart showing a method for processing data provided according to Embodiment 1 of the invention.

As shown in FIG. 1, a method for processing data is provided according to an embodiment of the invention, which includes the steps from Step 101 to Step 105.

Step 101 is to project a first structure light and a second structure light onto a surface of a target object, where the first structure light is a stripe-structure light.

Step 102 is to capture a first image including the target object.

Step 103 is to detect first image information corresponding to the first structure light in the first image, where the first image information is stripe image information.

Step 104 is to detect second image information corresponding to the second structure light in the first image.

Step 105 is to obtain a depth of the target object based on the first image information and the second image information.

In an embodiment of the invention, a first structure light and a second structure light are projected onto a surface of a target object, and first image information corresponding to the first structure light in the first image and second image information corresponding to the second structure light in the first image are detected, and a depth of the target object is obtained based on the first image information and the second image information, such that a measurement accuracy is improved.

Embodiment 2

Figure 2:
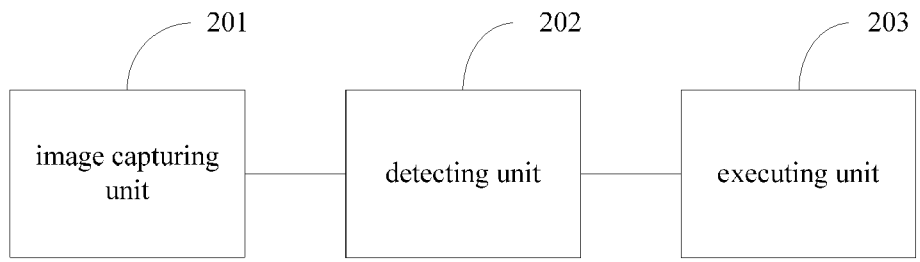
FIG. 2 is schematic structure diagram of an apparatus for processing data provided according to Embodiment 2 of the invention.

Correspondingly, an apparatus for processing data is provided according to the embodiment of the invention. As shown in FIG. 2, the apparatus includes:

an image capturing unit 201, configured to capture a first image including a target object in a case that a first structure light and a second structure light are projected onto a surface of the target object;

a detecting unit 202, configured to detect first image information corresponding to the first structure light in the first image and detect second image information corresponding to the second structure light in the first image, where the first image information is stripe image information; and an executing unit 203, configured to obtain a depth of the target object based on the first image information and the second image information.

Embodiment 3

Another method for processing data is provided according to the embodiment of the invention, which includes:

capturing a first image including a target object in a case that stripe-structure lights are projected onto the target object, where the stripe-structure lights include multiple primary stripe lights and at least two reference stripe lights, where a width of each reference stripe light is different from a width of each primary stripe light of the multiple primary stripe lights. It may be noted that, in a case the stripe-structure light is infrared or visible light, the process may be realized by use of coding or colors.

detecting stripe image information corresponding to the stripe-structure lights in the first image;

obtaining a sequence and positions of stripes of the multiple primary stripe lights and the at least two reference stripe lights based on the stripe image information; and obtaining a depth of a three-dimension image of the target object based on the sequence and positions of the stripes.

Embodiment 4

Another apparatus for processing data is provided according to the embodiment of the invention, which includes:

an image capturing unit, configured to capture a first image including a target object in a case that stripe-structure lights are projected onto the target object, where the stripe-structure lights include multiple primary stripe lights and at least two reference stripe lights, where a width of each reference stripe light is different from a width of each primary stripe light of the multiple primary stripe lights;

a detecting unit, configured to detect stripe image information corresponding to the stripe-structure lights in the first image;

an acquisition unit, configured to obtain a sequence and positions of stripes of the multiple primary stripe lights and the at least two reference stripe lights based on the stripe image information; and an executing unit, configured to obtain a depth of a three-dimension image of the target object based on the sequence and positions of the stripes.

By the method for processing data and the apparatus thereof, the stripe-structure lights are set to include the primary stripe lights and the reference stripe lights with different widths, such that the deformation of the stripe-structure lights may be larger in a case that the first image of the stripe-structure lights projected onto the target object, especially when the stripe-structure lights are projected onto an object with a great depth. The reference stripe lights with different widths with the primary stripe lights may be easily recognized when recognizing the stripe image, and then the sequence of the stripes of the primary stripe lights may be determined based on the reference stripe lights, thereby avoiding a malposed recognition or a misrecognition in the process of recognizing the stripe image in the first image, solving the technical issue in the conventional technology that in a case that a picture of the stripe lights projected onto an object with a great depth, a malposed recognition or a misrecognition may occur in the process of recognizing the stripe lights in the image, and then obtaining a depth of a three-dimension of the object may be effected. Therefore the sequence and the positions of the stripe lights in the image may be easy to be recognized, and obtaining the depth of the three-dimension image of the object may be improved.

To make the technical solution better understood, the technical solution may be described in detail in conjunction with drawings and embodiments.

Embodiment 5

Figure 3:
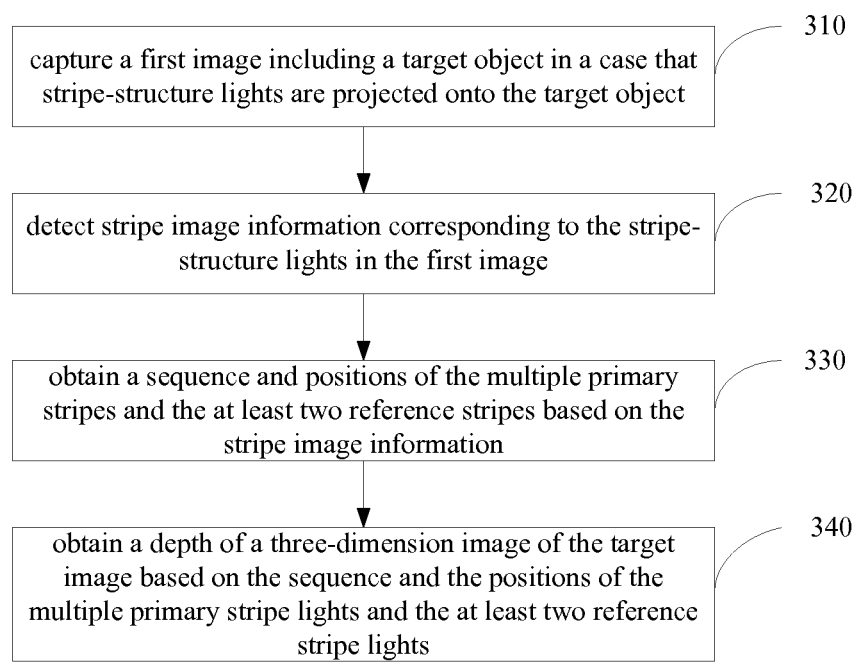
FIG. 3 is a flowchart showing a method for processing data provided according to Embodiment 5 of the invention.

FIG. 3 is a flowchart showing a method for processing data provided according to the embodiment of the invention. The method for processing data includes the steps from Step 310 to Step 340.

Step 310 is to capture a first image including a target object in a case that stripe-structure lights are projected onto the target object, where the stripe-structure lights include multiple primary stripe lights and at least two reference stripe lights, where a width of each reference stripe light is different from a width of each primary stripe light of the multiple primary stripe lights.

The stripe-structure lights are commonly parallel lights, where the parallel lights include the primary stripe lights and reference stripe lights with a width different from a width of the primary stripe lights. The primary stripe light may be wider than the reference stripe light or narrower than the reference stripe light, which may be set as needed. In this embodiment, the primary stripe light is narrower than the reference stripe light.

In addition, there may be primary stripe light between the two reference stripe lights, or there may not be any primary stripe light between the two reference stripe lights. In a case the number of the reference stripe lights is greater than or equal to 3 and there is primary stripe light between the reference stripe lights, the number of the primary stripe lights between each two adjacent reference stripe lights may be the same or not. In this embodiment, the numbers of the primary stripe lights between each two adjacent reference stripe lights are the same.

Alternatively, a distance between the at least two reference stripe lights may be set as needed, for example, the interval between two adjacent reference stripe lights of the at least two reference stripe lights is grater than or equal to a first predetermined value, where the first predetermined value may be 1 cm, 3 cm, 5 cm, 20 cm, 50 cm, etc.

The target object may be an object of which a three-dimension image needs to be captured partly or overall, and the first image may be acquired by an image acquisition apparatus such as a camera.

Step 320 is to detect stripe image information corresponding to the stripe-structure lights in the first image.

In the embodiment of the invention, stripe image information of the stripe-structure lights in the first image is detected in a case that the first image is acquired, where the stripe image information includes a sequence, positions and coordinates of the primary stripes and the reference stripes. That is, it is needed to detect which stripe image information in the first image corresponds to the stripe-structure lights, and the following steps may be performed in a case that the stripe image information corresponding to the stripe-structure lights is extracted.

Step 330 is to obtain a sequence and positions of the multiple primary stripes and the at least two reference stripes based on the stripe image information.

In the embodiment of the invention, primary strip image information corresponding to the multiple primary stripe lights and reference stripe image information corresponding to the at least two reference stripe lights may be recognized from the stripe image information. The sequence of the multiple primary stripes may be determined based on the reference stripe image information and the primary stripe information, and the positions of the multiple primary stripe lights and the at least two reference stripe lights may be acquired.

That is, Step 330 is performed in a case that the stripe image information of the stripe-structure lights is detected in Step 320 to determine the reference stripe image information corresponding to the reference stripe light and the primary stripe image information corresponding to the primary stripe lights. The sequence of the multiple primary stripe lights is determined and the stripe positions of the primary stripe lights and the reference stripe lights are acquired based on the reference stripe image information corresponding to the reference stripe lights and the primary stripe image information corresponding to the primary stripe lights. The stripe position may be a coordinate value of each point of the multiple primary stripes and the at least two reference stripes in the first image. That is, the process of obtaining the stripe position of the primary stripe lights and the reference stripe lights is to obtain a coordinate value of each point of the multiple primary stripes and the at least two reference stripes in the first image.

Step 340 is to obtain a depth of a three-dimension image of the target image based on the sequence and the positions of the multiple primary stripe lights and the at least two reference stripe lights.

The process of obtaining of depth may be performed after the sequence and positions of the primary stripes and the reference stripes are acquired, the conventional method for obtaining a three-dimension image of a target object. For example may be adopted, the depth value of the target object may be obtained based on the deformation of the stripes, and then the depth of the image may be obtained based on the depth value.

The depth of the three-dimension image of the target object is obtained based on the sequence of the stripes and the coordinate values, in a case that the sequence of the stripes and the coordinate values are obtained. That is, a coordinate value of each stripe may be obtained in a case that the sequence of the stripes and the coordinate values are determined, and then deformation of the stripe may be calculated based on the coordinate value. The depth value of the target object may be obtained based on the deformation, and then the depth of the image may be obtained based on the depth value.

Figure 4:
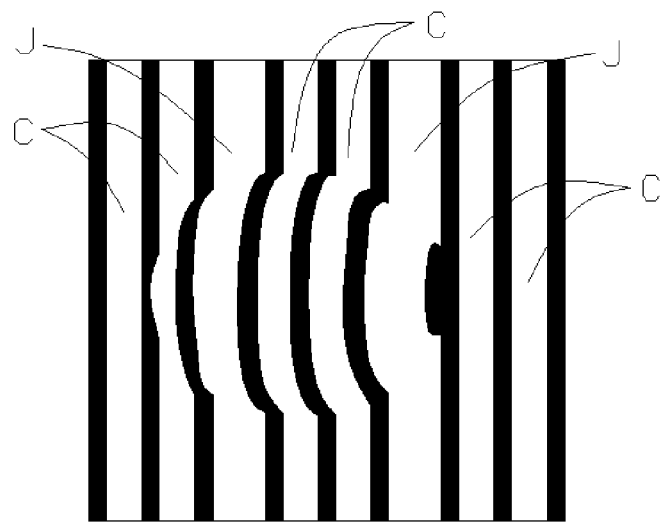
FIG. 4 is a schematic diagram of a first image provided according to Embodiment 5 of the invention.

The steps of the method for processing may be illustrated by taking the case that the stripe-structure lights include 6 primary stripe lights C and 2 reference stripe lights as an example. The 2 reference stripe lights have a same width which is different from the width of the 6 primary stripe lights. The stripe-structure lights are deformed in a case that the stripe-structure lights are projected onto the target object. Therefore, a first image of the deformed stripe-structure lights shown in FIG. 4 is acquired.

In a case that the first image is acquired, the stripe image information of the stripe-structure light image corresponding to the primary stripe lights and the reference stripe lights may be recognized, and then the stripe image information may be extracted. Then the image information corresponding to the 6 primary stripe lights C may be recognized, and the image information corresponding to the 2 reference stripe lights J may be recognized, such that the sequence of the primary stripe lights may be obtained based on the image information corresponding to the reference stripe lights, and positions such as the coordinate values of the primary stripe lights may be obtained correspondingly. At last, deformation of each the 6 primary stripe lights C and the 2 reference stripe lights J may be obtained based on the sequence of the stripes and the stripe positions. The depth value of the target object may be obtained based on the deformation, and then the depth of the image may be obtained based on the depth value.

By the method for processing data, the stripe-structure lights are set to include the primary stripe lights and the reference stripe lights with different widths, such that the deformation of the stripe-structure lights may be larger in a case that the first image of the stripe-structure lights projected onto the target object, especially when the stripe-structure lights are projected onto an object with a great depth. The reference stripe lights with different widths with the primary stripe lights may be easily recognized when recognizing the stripe image, and then the sequence of the stripes of the primary stripe lights may be determined based on the reference stripe lights, thereby avoiding a malposed recognition or a misrecognition in the process of recognizing the stripe image in the first image, solving the technical issue in the conventional technology that in a case that an image of the stripe lights projected onto an object with a great depth, a malposed recognition or a misrecognition may occur in the process of recognizing the stripe lights in the image, and then obtaining a depth of a three-dimension of the object may be effected. Therefore the sequence and the positions of the stripe lights in the image may be easy to be recognized, and obtaining the depth of the three-dimension image of the object may be improved.

In the embodiments of the invention, the at least two reference stripe lights have the same width. In other embodiment of the invention, the at least two reference stripe lights may have different widths. Detailed description thereof is given in the following.

In the embodiments of the invention, in a case that the reference stripe lights include M first reference stripe lights and N second reference stripe lights, the first reference stripe lights and second reference stripe lights have different widths, and M and N are integers greater than or be equal to 1, the process of recognizing, from the stripe image information, the primary strip image information corresponding to the multiple primary stripe lights and the reference stripe image information corresponding to the reference stripe lights includes:

recognizing, from the stripe image information, the primary strip image information corresponding to the multiple primary stripe lights, first reference stripe image information corresponding to the M first reference stripe lights and second reference stripe image information corresponding to the N second reference stripe lights.

The widths of the first reference stripe lights and the second reference stripe lights may be smaller or greater than the width of the primary stripe lights. In this embodiment, in order to search out the first reference stripe light and the second reference stripe light, the widths of the first stripe reference light and the second reference stripe light may be set to be greater than the width of the primary stripe lights. In addition, the width of the first reference stripe light is greater than the width of the second reference stripe light. The interval between two adjacent second reference stripe lights is greater than or be equal to a first predetermined value.

Furthermore, the process of determining a sequence of the multiple primary stripe lights based on the image information corresponding to the reference stripe lights includes:

determining a sequence of the second reference stripe lights based on the first reference stripe image information; and determining a sequence of the primary stripe lights based on the second reference stripe image information.

The steps of the method for processing data may be illustrated by taking the case that the stripe-structure lights include 6 primary stripe lights C, 1 first reference stripe light J1 and 2 second reference stripe lights J2 as an example.

Figure 5:
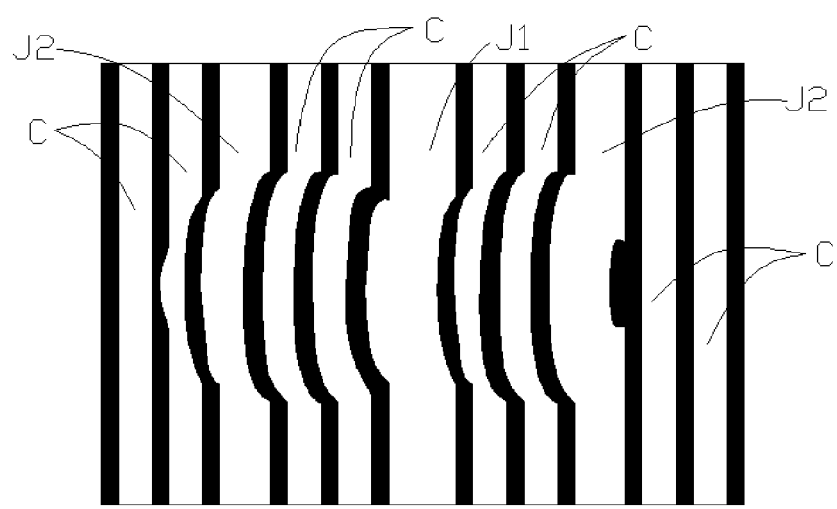
FIG. 5 is a schematic diagram of a first image provided according to another embodiment of the invention

As shown in FIG. 5, the width of the first reference stripe light J1 is greater than the width of the second reference stripe light J2, and the width of the second reference stripe light J2 is greater than the width of the 6 primary stripe lights C. The stripe-structure lights are deformed in a case that the stripe-structure lights are projected onto the target object. Therefore, a first image of the deformed stripe-structure lights shown in FIG. 4 is acquired.

In a case that the first image is acquired, the stripe image information corresponding to the stripe structure lights may be recognized, and then the stripe image information may be extracted. Then the stripe image information corresponding to the 6 primary stripe lights C in the stripe image information, the stripe image information corresponding to the first reference stripe light J1 and the stripe image information corresponding to the 2 second reference stripe lights J2 may be recognized, such that the sequence of the 2 second reference stripe lights J2 may be obtained easily based on the stripe image information corresponding to the first reference stripe light, and the stripe position such as the coordinate values of the 2 second reference stripe lights J2 may be obtained correspondingly. The sequence of the 6 primary stripe lights C may be obtained easily based on the stripe image information corresponding to the second reference stripe J2, and the stripe position such as the coordinate values of the 6 primary stripe lights C may be obtained correspondingly. At last, deformation of each the 6 primary stripe lights C, the first reference stripe light J1 and the 2 second reference stripe lights J2 may be obtained based on the sequence and the positions of the stripe lights. The depth value of the target object may be obtained based on the deformation, and then the depth of the image may be obtained based on the depth value.

By the method for processing data, the stripe-structure lights are set to include the primary stripe lights and the reference stripe lights with different widths, such that the deformation of the stripe-structure lights may be larger in a case that the first image of the stripe-structure lights projected onto the target object, especially when the stripe-structure lights are projected onto an object with a great depth. The reference stripe lights with different widths with the primary stripe lights may be easily recognized when recognizing the stripe image, and then the sequence of the stripes of the primary stripe lights may be determined based on the reference stripe lights, thereby avoiding a malposed recognition or a misrecognition in the process of recognizing the stripe image in the first image, solving the technical issue in the conventional technology that in a case that an image of the stripe lights projected onto an object with a great depth, a malposed recognition or a misrecognition may occur in the process of recognizing the stripe lights in the image, and obtaining a depth of a three-dimension of the object may be effected. Therefore the sequence and the positions of the stripe lights in the image may be easy to be recognized, and obtaining the depth of the three-dimension image of the object may be improved.

Embodiment 6

An apparatus for processing data 600 is provided according to the embodiment of the invention. FIG. 6 is schematic structure diagram of the apparatus for processing data 600. The apparatus for processing data 600 includes an image capturing unit 610, a detecting unit 620, an acquisition unit 630 and an executing unit 240.

The image capturing unit 610 is configured to capture a first image including a target object in a case that stripe-structure lights are projected onto the target object, where the stripe-structure lights include multiple primary stripe lights and at least two reference stripe lights, where a width of each reference stripe light is different from a width of each primary stripe light of the multiple primary stripe lights.

The detecting unit 620 is configured to detect stripe image information corresponding to the stripe-structure lights in the first image.

The acquisition unit 630 is configured to obtain a sequences and positions of the multiple primary stripe lights and the at least two reference stripe lights based on the stripe image information.

The executing unit 640 is configured to obtain a depth of a three-dimension image of the target object based on the sequences and positions of the multiple primary stripe lights and the at least two reference stripe lights.

In this embodiment, the width of the reference stripe light is greater than the width of the primary stripe light.

In this embodiment, in a case that there more than 3 reference stripe lights, the number of the primary stripe lights between each two adjacent reference stripe lights may be the same.

In this embodiment, the interval between two adjacent reference stripe lights is grater than or equal to a first predetermined value.

In this embodiment, the acquisition unit may be configured to recognize, from the stripe image information, primary strip image information corresponding to the multiple primary stripe lights and reference stripe image information corresponding to the reference stripe lights; and determine the sequence of the multiple primary stripe lights based on the reference stripe image information corresponding to the reference stripe lights and obtain the positions of the primary stripe lights.

In this embodiment, the acquisition unit may be configured to acquire a coordinate value of the multiple primary stripe lights and the reference stripe lights in the first image.

In this embodiment, the executing unit may be configured to obtain a depth of a three-dimension image of the target image based on the sequence and the coordinate values of the primary stripe lights.

In this embodiment, the reference stripe lights include M first reference stripe lights and N second reference stripe lights, and the first reference stripe lights and second reference stripe lights have different widths, where M is greater than or equal to 1 and N is greater than or equal to 2.

In this embodiment, the acquisition unit may be configured to recognize, from the stripe image information, the strip image information corresponding to the multiple primary stripe lights, first reference stripe image information corresponding to the M first reference stripe lights and second reference stripe image information corresponding to the N second reference stripe lights.

In this embodiment, the acquisition unit may be further configured to determine a sequence of the multiple primary stripe lights based on the reference stripe image information.

In this embodiment, the widths of the first reference stripe light and the second reference stripe light are greater than the width of the primary stripe lights.

In this embodiment, the width of the first reference stripe light is greater than the width of the second reference stripe light.

In this embodiment, the interval between two adjacent second reference stripe lights is greater than or be equal to a first predetermined value.

By the apparatus for processing data, the stripe-structure lights are set to include the primary stripe lights and the reference stripe lights with different widths, such that the deformation of the stripe-structure lights may be larger in a case that the first image of the stripe-structure lights projected onto the target object, especially when the stripe-structure lights are projected onto an object with a great depth. The reference stripe lights with different widths with the primary stripe lights may be easily recognized when recognizing the stripe image, and then the sequence of the stripes of the primary stripe lights may be determined based on the reference stripe lights, thereby avoiding a malposed recognition or a misrecognition in the process of recognizing the stripe image in the first image, solving the technical issue in the conventional technology that in a case that an image of the stripe lights projected onto an object with a great depth, a malposed recognition or a misrecognition may occur in the process of recognizing the stripe lights in the image, and then obtaining a depth of a three-dimension of the object may be effected. Therefore the sequence and the positions of the stripe lights in the image may be easy to be recognized, and obtaining the depth of the three-dimension image of the object may be improved.

Another method for processing data and another apparatus for processing data are further provided according to an embodiment of the invention, which solves the technical issue in the conventional technology that there may be an error in the process of determining a stripe change of the stripe-structure lights and a workload may be increased accordingly, therefore the changed stripe-structure lights may be determined rapidly.

Embodiment 7

A method for processing data provided according to an embodiment includes: in a case that stripe-structure lights are projected onto a target object by a stripe-structure light source, a first image on a projecting plane is formed after the stripe structure lights are reflected by the target object, stripe image information corresponding to F stripe lights is acquired, where L stripe lights in the F stripe lights are different from the other stripe lights, where F is an integer and F≥2, L is an integer and 2≤L≤F; positions of the F stripe lights are determined based on the stripe image information corresponding to the F stripe lights; and a depth of the target object is determined based on the positions of the F stripe lights.

To make the technical solution better understood, the technical solution may be described in detail in conjunction with the drawings and the embodiments.

Embodiment 8

The method for processing data provided according to an embodiment of the invention is applied to an electronic device, where the electronic device may be a depth camera based on structured lights. As shown in FIG. 7, the method may include the steps from Step 701 to Step 703.

In Step 701, in a case that stripe-structure lights are projected onto a target object by a stripe-structure light source, a first image on a projecting plane is formed after the stripe structure lights are reflected by the target object, stripe image information corresponding to F stripe lights distributed on the target object is acquired, where L stripe lights in the F stripe lights are different from the other stripe lights, where F is an integer and F≥2, L is an integer and 2≤L≤F.

In Step 702, F positions of the F stripe lights are determined based on the stripe image information corresponding to the F stripe lights.

In Step 703, a depth of the target object is determined based on the F positions of the F stripe lights.

In Step 701, the stripe image information corresponding to the F stripe lights obtained may include two kinds of forms, the first kind is widths of the F stripe lights, and the second kind is patterns of the F stripes lights.

The process of obtaining the widths of the F stripe lights may be described in the following.

In a case that stripe-structure lights are projected onto a target object by a stripe-structure light source, multiple stripe lights of which the widths of the stripes are different are formed. There are K stripe lights with different widths in the F stripe lights, and there are J stripe lights with different widths in the F stripe lights, where the K stripe lights and the J stripe lights are not overlapped.

Figure 8:
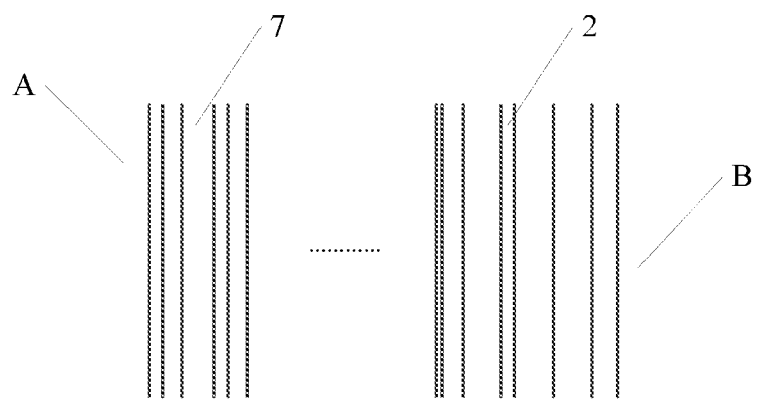
FIG. 8 is a schematic diagram of information of multiple stripes obtained is widths of the multiple stripes according to Embodiment 8 of the invention.

As shown in FIG. 8, the obtained stripe image information corresponding to the stripe-structure lights are different. For example, in a first area A, the stripe lights with the width parameter of 2, 4, 7, 3, 5 are obtained, and then the stripe light with a width parameter of 7 may be determined based on that the width parameters of the two adjacent stripe lights in front of the stripe are 2 and 4 respectively, and the width parameters of the two adjacent stripe lights following the stripe light are 3 and 5 respectively. Alternatively, in order to determine the stripe lights more accurately, the information of more stripe lights may be added. For example, in the second area B, the width parameters of the stripe lights are 1, 3, 6, 2, 9, 8, 7, and then the stripe light with a width parameter of 2 may be determined based on the width parameters of the front and following 3 groups of stripe lights.

By the foregoing method, the technical issue in the conventional technology that the stripes with the same width and the same brightness are difficult to be determined may be solved.

The process of obtaining the patterns of the F stripe lights may be described in the following.

In a case that stripe-structure lights are projected onto a target object by a stripe-structure light source, the stripe lights with a pattern are formed. Centrosymmetric patterns are set at a same interval on any stripe lights of the F stripes, where the pattern is configured to recognize the stripe light, and the patterns of any two adjacent stripes of the F stripe lights are different.

Figure 9:
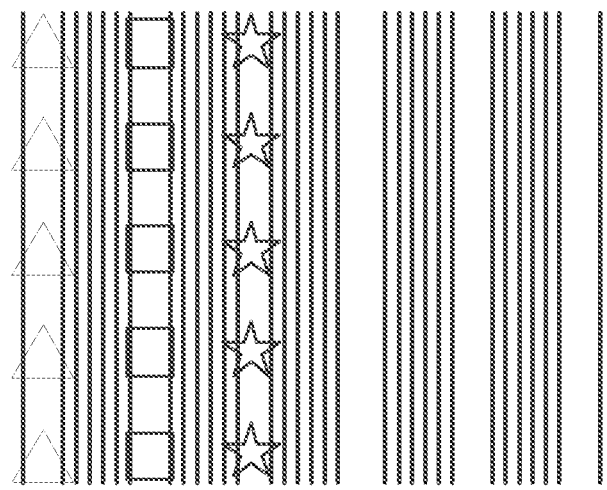
FIG. 9 is a schematic diagram of the information of the multiple stripes obtained is patterns of the multiple stripes according to Embodiment 8 of the invention.

As shown in FIG. 9, a pattern of a stripe light is taken as an example. For example, equilateral triangles are set at a same interval on the stripe light, and the centrosymmetric patterns such as squares and pentagrams may be set on two adjacent stripe lights.

Setting the interval may take account of two factors. Firstly, the interval may be smaller than the width (or height) of a minimum object to be recognized in a scene, such that both the patterns and the stripe lights of the object may be detected. Secondly, the stripe light between two patterns may not be too short. Because the stripe light is capable of indicating directions, the direction may be judged incorrectly if the stripe light between two patterns is too short.

The stripe lights may be set with different patterns. Alternatively, in order to reduce the amount of the patterns to be used, the patterns in a pattern set may be inserted into the corresponding stripe lights periodically in sequence. That is, the patterns may be set on the stripe lights periodically. Alternatively, the multiple stripe lights may be graded, and each grade of stripe light has a reference stripe light, and the pattern may be only set on the reference stripe light, and the reference stripe lights of the multiple grades of stripe lights may be set with different patterns.

The pattern may be designed to be simple and with high discrimination, such that the stripe lights may be easily detected or recognized. In addition, the patterns are not easy to be confused. The pattern may be centrosymmetric preferably, such that a position of a central subpixel of the pattern may be calculated accurately, thereby improving an accuracy of parallax calculation.

By setting patterns on the multiple stripe lights, the technical issue in the conventional technology that the stripe-structure lights recognition may be inaccurate and the workload may be increased correspondingly may be solved. In addition, by coding the stripe lights by use of the patterns on the stripe lights, the directionality of the stripe lights may be reserved, thereby improving a robustness of the pattern decoding.

The sequence of the stripe lights may be determined correctly based on the stripe image information corresponding to the multiple stripe lights. The positions of the stripe lights may be determined based on the width or pattern of the stripe light, and detailed description thereof is given in the following.

Before the process of acquiring the widths of the F stripe lights, the method further includes:

acquiring F reference positions of the F stripe lights, where the F reference positions is acquired after the F stripe lights are reflected by a smooth plane without a target object.

In Step 702, the F second positions of the F stripe lights corresponding to the F stripe lights is as same as the F reference positions of the F stripe lights is judged based on the widths of the stripe lights. In a case that the F second positions of the F stripe lights corresponding to the F stripes is different from the F reference positions of the F stripe lights, the F positions of the F stripe lights may be determined.

It is to judge whether the position of the F stripe lights is changed relative to the reference position of the F stripe lights. In a case that the position of the F stripe lights is changed relative to the reference position of the F stripe lights, the position of the stripe lights may be determined based on the position of the changed stripe lights.

A distance difference between the F positions and the reference positions may be determined. And the depth of the target object may be determined based on the distance difference.

In an embodiment of the invention, in a case that it is determined that the F second positions of the F stripe lights are as same as the F reference positions of the F stripe lights, it is indicated that the depth of the target object is 0; otherwise, it is indicated that the depth of the target object is not 0, and then the depth of the target object may be calculated via a certain algorithm based on the distance difference between the positions of the stripe lights and the reference positions of the stripe lights.

In a similar way, whether the F third positions of the F stripe lights are as same as the F reference positions of the F stripe lights is judged based on the patterns of the F stripe lights. In a case that the F second positions of the F stripe lights are different from the F reference positions of the F stripes, the F positions of the F stripe lights may be determined. A distance difference between the F positions of the stripe lights and the reference positions of the stripe lights may be determined. And the depth of the target object may be determined based on the distance difference.

The detailed description of the foregoing process is omitted herein.

Embodiment 9

Figure 10:
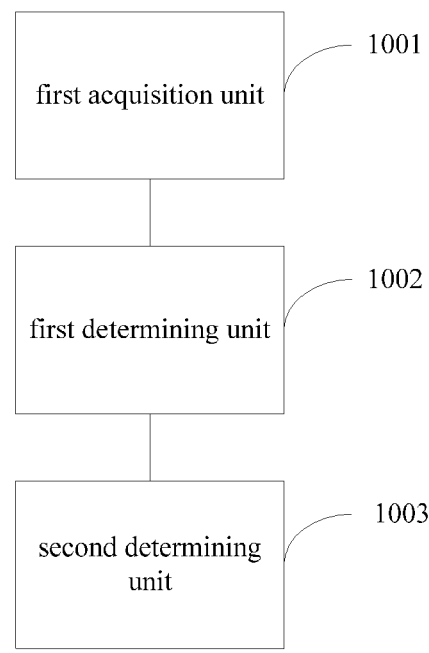
FIG. 10 is a schematic structure diagram of an apparatus for processing data provided according to Embodiment 9 of the invention.

Based on a same inventive concept, an apparatus for processing data is further provided according to the embodiment of the invention. As shown in FIG. 10, the apparatus for processing data includes:

a first acquisition unit 1001, configured to acquire stripe image information corresponding to F stripe lights distributed on a target object, in a case that stripe-structure lights are projected onto the target object by a stripe-structure light source, and the stripe-structure lights form a first image on a projecting plane after being reflected by the target object, where L stripe lights in the F stripe lights are different from the other stripe lights, where F is an integer and $F \geq 2$, L is an integer and $2 \leq L \leq F$;

a first determining unit 1002, configured to determine F positions of the F stripe lights based on the stripe image information corresponding to the F stripe lights; and a second determining unit 1003, configured to determine a depth of the target image based on the F positions of the F stripe lights.

Furthermore, the apparatus for processing data further includes:

a second acquisition unit, configured to acquire F reference positions of the F stripe lights.

Furthermore, the first acquisition unit 1001 is configured to acquire widths of the F stripe lights or patterns of the F stripes.

Furthermore, there are K stripe lights with different widths in the F stripe lights, and there are J stripe lights with different widths in the F stripe lights, where the K stripe lights and the J stripe lights are not overlapped.

Furthermore, the stripe image information corresponding to the F stripe lights includes centrosymmetric patterns set at a same interval on any stripe lights of the F stripe lights, where the pattern is configured to recognize the stripe light, and the patterns of any two adjacent stripes of the F stripe lights are different.

Furthermore, the first determining unit 1002 includes:

a first judging unit, configured to judge whether F second positions of the F stripe lights are as same as the F reference positions of the F stripe lights based on the widths of the stripe lights;

a first determining sub-unit, configured to determine the F positions of the F stripe lights in a case that the F second positions of the F stripe lights are different from the F reference positions of the F stripe lights.

Furthermore, the first determining unit 1002 includes:

a second judging unit, configured to judge whether F third positions of the F stripe lights are as same as the F reference positions of the F stripes based on the patterns of the F stripe lights; and a second determining sub-unit, configured to determine the F positions of the F stripe lights in a case that the F third positions of the F stripe lights are different from the F reference positions of the F stripe lights.

Furthermore, the second determining unit 1003 may include:

a third determining unit, configured to determine a distance difference between the F positions of the F stripe lights and the reference positions of the F tripe lights based on the F positions; and a fourth determining sub-unit, configured to determine the depth of the target object based on the distance difference.

Because the apparatus for processing data provided according to the embodiment is the apparatus implementing the method for processing data provided according to the embodiments of the invention, those skilled in the art may understand the implementation of the apparatus for the processing and other variations thereof based on the method for processing data provided according to the embodiments of the invention, the detailed description of the apparatus for processing data is omitted herein. The apparatus for processing data adopted by those skilled in the art in the process of implementing the method for processing data provided according to the embodiments of the invention, fall into the protection scope of the invention.

The one or more technical solutions provided according to the embodiments of the invention may have at least the technical effects as follows.

The technical solution is described as follows, including: in a case that stripe-structure lights are projected onto a target object by a stripe-structure light source, a first image on a projecting plane is formed after the stripe structure lights are reflected by the target object, stripe image information corresponding to F stripe lights is acquired, where L stripe lights in the F stripe lights are different from the other stripe lights, where F is an integer and F≥2, L is an integer and 2≤L≤F; positions of the F stripe lights are determined based on the stripe image information corresponding to the F stripe lights; and a depth of the target object is determined based on the positions of the F stripe lights. Thereby solving the technical issue in the conventional technology that there may be an error in the process of determining a stripe change of the stripe-structure lights and a workload may be increased accordingly, therefore the changed stripe-structure lights may be determined rapidly.

Those skilled in the art may understand clearly that the present invention may be embodied as method, system or compute program product. Therefore, the invention may be implemented via only hardware, via only software, or via an integration of software and hardware. The invention may be applied to a computer program product implemented by one or more compute-available storage medium (including but not limited to disk storage, CD-ROM, optical storage) including computer-available program code.

The invention is described based on the flowchart and/or block diagram of the method, device (system) or computer program product provided according to the embodiments of the invention. It may be understood that, the flow and/or block in the flowchart and/or block diagram and a combination of the flow and/or block in the flowchart and/or block diagram may be implemented via computer program instructions. The computer program instructions may be applied to a processor of a computer, a dedicated computer, an embedded processor or other programmable data processing devices, to make a machine which may realize the functions defined in the one or more blocks in the block diagram and/or one or more flows in the flowchart via the instructions executed by the processor of the computer or other programmable data processing device.

These computer program instructions may also be stored in a computer-readable storage which may lead a computer or other programmable data processing devices to work in a certain way, such that the instructions stored in the computer-readable storage may make a product including an instruction apparatus, where the instruction apparatus realizes the functions defined in the one or more blocks in the block diagram and/or one or more flows in the flowchart.

These computer program instructions may also be loaded into a computer or other programmable data processing devices, such that a series of operational procedures may be executed by the computer or other programmable data processing devices to make a processing which may be realized by computer, and then the procedures of realizing the functions defined in the one or more blocks in the block diagram and/or one or more flows in the flowchart may be provided by the instructions executed by the computer or other programmable data processing devices.

Embodiment 10

The computer program instruction corresponding to the method for processing data provided according to the embodiment of the invention may be stored in the storage medium such as optical disk, hard disk, USB flash disk. In a case that the computer program instruction corresponded to the data processing method is read or executed by an electronic device, the process thereof including:

in a case that stripe-structure lights are projected onto a target object by a stripe-structure light source, a first image on a projecting plane is formed after the stripe structure lights are reflected by the target object, stripe image information corresponding to F stripe lights distributed on the target object is acquired, where L stripe lights in the F stripe lights are different from the other stripe lights, where F is an integer and F≥2, L is an integer and 2≤L≤F;

F positions of F stripe lights are determined based on the stripe image information corresponding to the F stripe lights; and a depth of the target object is determined based on the F positions of the F stripe lights.

Optionally, the storage medium further stores other computer instructions, where the computer instructions are executed before the stripe-structure lights are projected onto a target object by a stripe-structure light source and a first image is formed on a projecting plane after the stripe structure lights are reflected by the target object, the executing of the computer instructions includes:

F reference positions of the F stripe lights are acquired.

Optionally, the process of executing the computer instruction stored in the storage medium corresponded to the process of acquiring stripe image information corresponding to the F stripe lights distributed on the target object includes:

widths of the F stripe lights or patterns of the F stripes lights are acquired.

Optionally, the process of executing the computer instruction stored in the storage medium corresponding to the process of acquiring the widths of the F stripe lights includes:

there are K stripe lights with different widths in the F stripe lights, and there are J stripe lights with different widths in the F stripe lights, where the K stripe lights and the J stripe lights are not overlapped.

Optionally, the process of executing the computer instruction stored in the storage medium corresponding to the process of acquiring the patterns of the F stripe lights includes:

scentrosymmetric patterns are set at a same interval on any stripe lights of the F stripes, where the pattern is configured to recognize the stripe light, and the patterns of any two adjacent stripes of the F stripe lights are different.

Optionally, the process of executing the computer instruction stored in the storage medium corresponding to the process of determining F positions of F stripe lights based on the stripe image information in a case that the stripe image information is the widths of the F stripe lights, includes:

judging whether the F second positions of the F stripe lights are as same as the F reference positions of the F stripe lights; and determining the F positions of the F stripe lights in a case that the F third positions of the F stripe lights are different from the F reference positions of the F stripe lights.

Optionally, the process of executing the computer instruction stored in the storage medium corresponding to the process of determining F positions of F stripe lights based on the stripe image information in a case that the stripe image information is the patterns of the F stripe lights, includes:

judging whether the F third positions of the F stripe lights are as same as the F reference positions of the F stripes lights based on the patterns of the F stripe lights; and determining the F positions of the F stripe lights in a case that the F third positions of the F stripe lights are different from the F reference positions of the F stripe lights.

Optionally, the process of executing the computer instruction stored in the storage medium corresponding to the process of determining a depth of the target object based on the F positions of the F stripe lights includes:

determining a distance difference between the F positions of the F stripe lights and the reference positions of the F stripe lights based on the F positions; and determining the depth of the target object based on the distance difference.

Embodiment 11

Another method for processing data is provided according to the embodiment of the invention, by which a depth map with a higher resolution may be obtained through a small amount of calculation.

Figure 11:
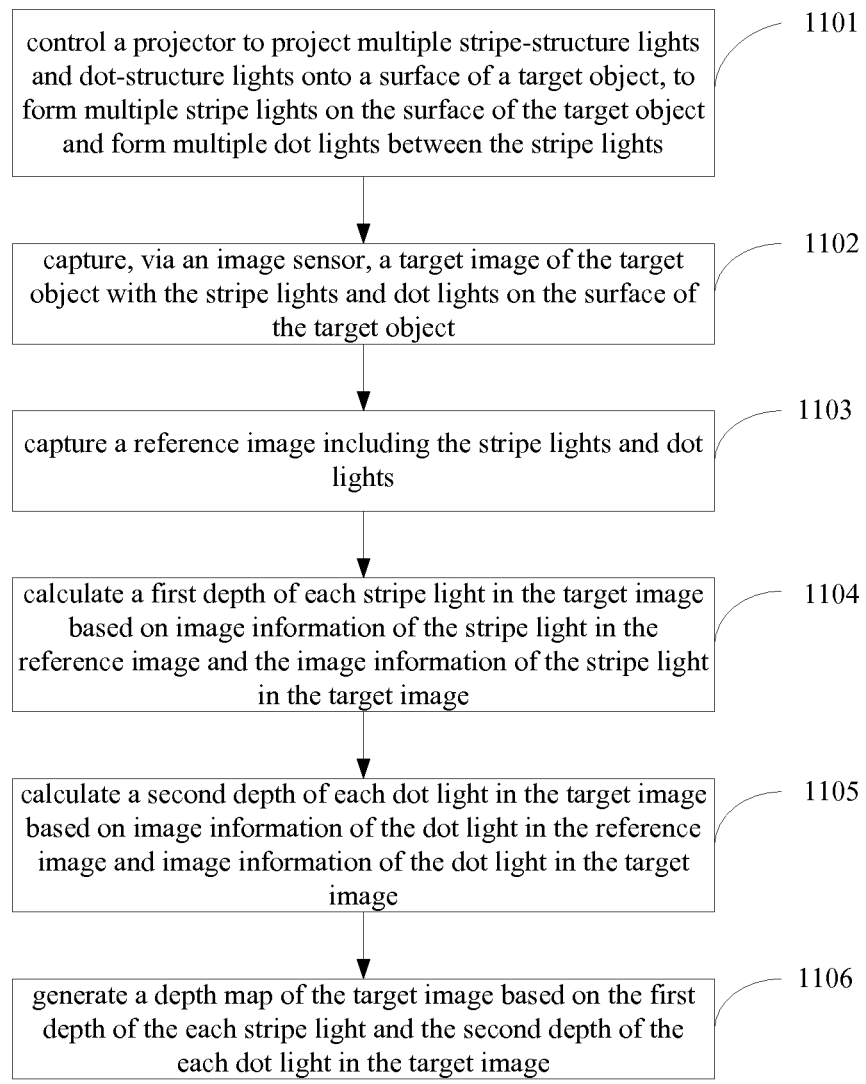
FIG. 11 is a flowchart showing a method for processing data provided according to Embodiment 11 of the invention.

FIG. 11 is a flowchart for a method for processing data provided according to the embodiment of the invention. The method provided according to the embodiment is applied to an electronic device, where the electronic device includes at least an image sensor and a projector. For example, the electronic device may be a depth camera based on structured light, or other electronic devices with camera and structured light emitter. The method includes the steps from Step 1101 to Step 1006.

Step 1101 is to control a projector to project multiple stripe-structure lights and dot-structure lights onto a surface of a target object, to form multiple stripe lights on the surface of the target object and form multiple dot lights between the stripe lights.

The projector may be called as a light emitter, which may emit structure lights and project the structure lights onto a target object to be measured in a way to project a light pattern with a relevant structure onto the target object, where the structure light may be, for example, a stripe-structure light, dot-structure light or surface-structure light. The target object refers to the target to be performed on a depth analysis. To analyze a depth of the target object, the image of the target object may be acquired in the subsequent steps.

In an embodiment of the invention, the projector projects a stripe-structure light and a dot-structure light onto a surface of a target object, such that multiple stripe lights are formed on the surface of the target object, and light ports may be formed between any two stripe lights. To form the stripe lights on the surface of the target object, light beams projected by the projector forms a narrow light plane in space. In a case that the light plane is intersected with the surface of the target, a stripe light may be formed on the surface of the target object.

The implementing process of projecting by a projector multiple stripe lights onto the surface of the target object and projecting dot lights between the stripe lights is similar to the process of controlling the projector to project a specific pattern onto the target object of the conventional technology. For example, a grating imaging method may be adopted. For example, a grating with a specific pattern may be set at a projecting shot of the projector, and then a light pattern with the specific pattern may be formed on the surface of the target object after the projector emits light. For another example, a space coding method may be adopted, a rule for generating the multiple stripe-structure lights and the dot-structure lights may be predetermined, and the projector may be controlled to emit lights based on the rule, in a way to project multiple stripe lights onto the surface of the target object and project dot lights between the stripe lights It may be understood that, the target object may be an object, or two or more objects within a specific area, or an object including multiple objects and backgrounds within a specific area.

Step 1102 is to capture, via an image sensor, a target image of the target object with the stripe lights and dot lights on the surface of the target object.

After the projector projects the stripe lights and dot lights on the surface of target object, the image sensor shoots the target object, and the obtained target image may include the target object and the stripe lights and dot lights on the surface of the target object.

Step 1103 is to capture a reference image including the stripe lights and dot lights.

Depth may not be acquired from a two-dimensional image captured by a common camera apparatus, and a depth analysis based on structure light is actually equal to a three-dimension measurement based on structure light, and then the depth of the captured image may be determined.

However, the target object in practice is usually three-dimensional rather than two-dimensional. After the projector projects a structure light to the target object, the projected structure light may be changed due to changes of the depth and possible gaps of the surface of the target object when the projected structure light is intersected with the target object, such that the structure light presented on the target object may be distorted. For example, the projected strip-structure light presented on the surface of the target object may be offset, discontinuous, etc.

In a process of analyzing depth, the three-dimensional information of the surface of the target object may be acquired based on the structure light distorted on the surface of the target object, such that the depths of the positions of the surface of the target object may be obtained. To determine the distortion of the structure light in the image of the target object, a reference image is required, and then a degree of distortion of the structure light on the target object may be determined based on the information of the structure light in the reference image.

The reference image including the information of the stripe-structure lights and dot-structure lights projected by the projector is acquired in advance to analyze the degree of distortion of the stripe lights and dot lights in the target image. That is to say, the strip-structure lights and dot-structure lights projected by the projector in the process of forming the reference image is as same as that in the process of forming the target image. The number of the strip-structure lights and dot-structure lights projected by the projector in the process of forming the reference image is as same as that in the process of forming the target image, and arrangements of the dot-structure lights between any two stripe-structure lights in the two processes are the same. The structure lights included in the reference image are not distorted, i.e., the stripe lights and spot lights in the reference image are not distorted, and however, the stripe lights and spot lights in the target image are the distorted structure lights.

The method of capturing the reference image is as same as that in the conventional technology. For example, the projector projects the stripe-structure lights and dot-structure lights onto a plane parallel to a projecting plane of the projector, and multiple stripe lights and spot lights are formed on the plane, and an image of the plane including the multiple stripe lights and dot lights is captured, and then a reference image is acquired. The depths of the parts of the plane are the same, thus the stripe-structure lights and the dot-structure lights may not be distorted in a case that the stripe-structure lights and the dot-structure lights are intersected with the plane.

Figure 12:
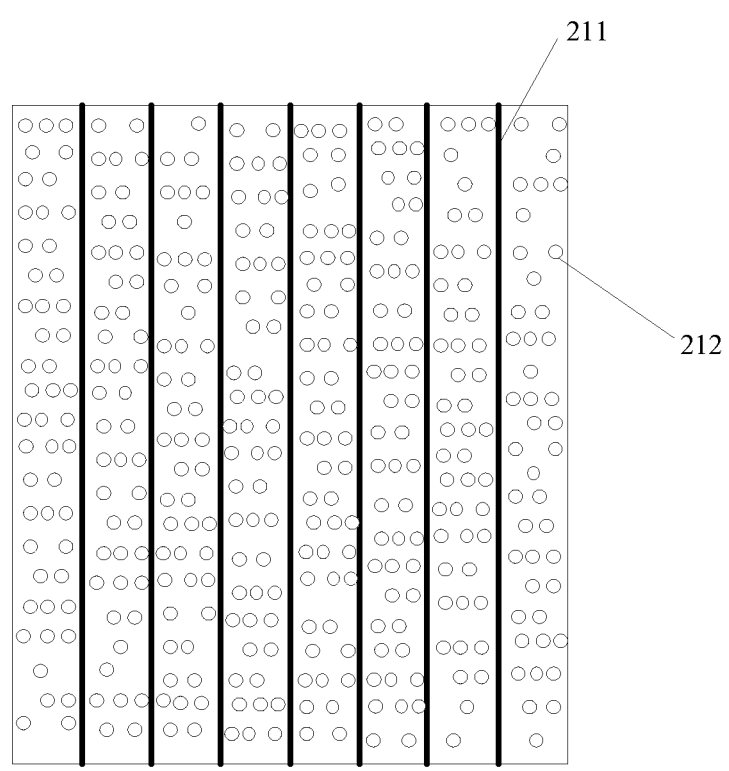
FIG. 12 is a schematic diagram of a distribution of the striations and dot stripes formed in a reference image provided according to an embodiment of the invention.

To facilitate the understanding, FIG. 12 shows the structure lights formed in the reference image after a projector projects stripe-structure lights and dot-structure lights. The reference image includes multiple stripe lights 211, where none of the stripe lights 211 is distorted, divided, or the parts of the stripe lights 211 are not displaced. Multiple dot lights 212 are distributed between the stripe lights 211, and the dot lights are not distorted.

Step 1104 is to calculate a first depth of each stripe light in the target image based on image information of the stripe light in the reference image and the image information of the stripe light in the target image.

The image information of the stripe light include at least the position of the stripe light in the image and may further include positional relationship between the stripe light and the other stripe lights.

The depth of the stripe light in the target image may be determined by comparing the image information of the stripe light in the target image with that in the reference image. The depth of the stripe light in the target image is called a first depth in the embodiments of the invention.

Step 1105 is to calculate a second depth of each dot light in the target image based on image information of the dot light in the reference image and image information of the dot light in the target image.

The image information of the dot light includes at least the position of the dot light in the image and may further include the positional relationship between the dot light and stripe lights, such as the position of the dot light is resided between which two stripe lights and the positional relationship between the dot light and the two stripe lights.

For any dot light in the target image, a depth of the dot light in the target image may be determined by comparing the image information of the dot light in the target image with the image information of the dot light in the reference image. The depth of the dot light in the target image is called a second depth.

Step 1106 is to generate a depth map of the target image based on the first depth of the each stripe light and the second depth of the each dot light in the target image.

Compared with the conventional technology, the depth map of the target image of the embodiments of the invention is generated based on the first depths of the stripe lights and the second depths of the dot lights in the target image.

In practical application, in a case that the stripe-structure lights are projected onto the target object, the stripe lights may be designed to be sparse in a way that the stripe lights presented on the target object may not interfere each other, that is, intervals between the stripe lights are not less than a predetermined value. However, intervals between the dot lights may be increased. For example, in order to avoid the interference between the stripe lights, there may be only 100 stripe lights in one line of the image within a same viewing angle; however there may be 640 dot lights in one line of the image. For example, as shown in FIG. 12, there are 7 stripe lights in one line; and there are far more than 10 dot lights in one line.

In a case that the depths of the stripe lights in the target image is calculated only based on the image information of the stripe lights and the depth map of the target image is generated only based on the first depth, a resolution ratio of the generated depth map may be lowered as a result. By projecting the stripe lights onto the surface of the target object and projecting the dot lights between the stripe lights, multiple dot lights may be distributed between the stripe lights in the target image, therefore the depths of the stripe lights and the depths of the dot lights in the target image may be calculated respectively. Therefore, the resolution ratio of the depth map may be improved significantly in a case that the depth map is generated based on the depths of the stripe lights and the depths of the dot lights in the target image.

It may be understood that, in a case that the depth map of the target image is generated based on the first depths of the stripe lights and the second depths of the dot lights in the target image, an interpolation calculation may be performed based on the first depths of the stripes and the second depths of the dot lights in the target image, and the depths of more parts of the target image may be obtained, and then the depth map of the target image may be generated based on the obtained depths of the parts of the target image.

It may be noted that, a performing sequence of Step 1104 and Step 1105 in an embodiment of the invention is not limited to the performing sequence shown in FIG. 1. In practical application, Step 1104 may be performed after Step 1105. Alternatively, Step 1104 and Step 1105 may be performed simultaneously.

In an embodiment of the invention, in the process of analyzing depth, by projecting by a projector multiple stripe lights and dot lights between the stripe lights onto a surface of a target object and capturing a target image of the target object including the multiple stripe lights and dot lights, the target image may include information of more structure lights, and then the position points of which the depths may be calculated in the target image may be increased. In addition, in a case that the target image is acquired, the first depths of the stripe lights in the target image and second depths of the dot lights in the target image may be calculated respectively based on image information of the stripe lights and dot lights in the reference image, and then a depth map of the target image may be generated based on the obtained first depths and second depths. Compared with the conventional technology in which the depth map is generated based on the stripe lights in the image, multiple dot lights are inserted between the stripe lights in this invention, and in the process of generating the depth map, both the depths of the stripe lights in the target image and the depths of the dot lights between the stripe lights are considered, therefore the depth map may have a higher resolution ratio.

In addition, in the conventional technology, a depth of an image is analyzed based on dot-structure lights, i.e., after projecting the dot lights onto a surface of a target object and capturing an image of the target object including the dot lights, a depth map of the image may be obtained based on image information of the dot lights in the image. Compared with the conventional technology, the stripe lights replace a few of the dot lights in this invention, and then the number of the positions of the dot lights to be calculated is reduced, thereby reducing a calculating amount and ensuring a requirement of real-time performance.

In an embodiment of the invention, for any one of the stripe lights in the target image, when calculating the first depth of the stripe light in the target image, a parallax between the stripe light in the target image and the stripe light in the reference image is calculated based on the image information of the stripe light and the image information of the stripe light in the reference image, and then the first depth of the stripe light in the target image may be determined based on the parallax between the stripe light in the target image and that in the reference image. The parallax refers to a displacement or difference in the apparent position of an object viewed along two different lines of viewpoint, and the angle between the two lines is called parallax. The distance between the two viewpoints is called baseline. A distance between an object and a viewer may be calculated as long as a parallax angle and a length of base line are acquired.

A few of the stripe lights in the target image may be distorted, for example, a few of the stripe lights may be divided into multiple sections and offset, therefore it is required to locate the stripe lights in the target image and combine the sections of a divided stripe light before calculating the stripe lights in the target image. The process is similar to the conventional technology, and detailed description thereof is omitted herein.

For any one of the dot lights in the target image, when calculating the second depth of the dot lights in the target image, a parallax between the two dot lights may be calculated based on the image information of the dot light in the target image and the image information of the dot light in the reference image, and then the second depth of the dot light in the target image may be determined based on the parallax.

Embodiment 12

Figure 13:
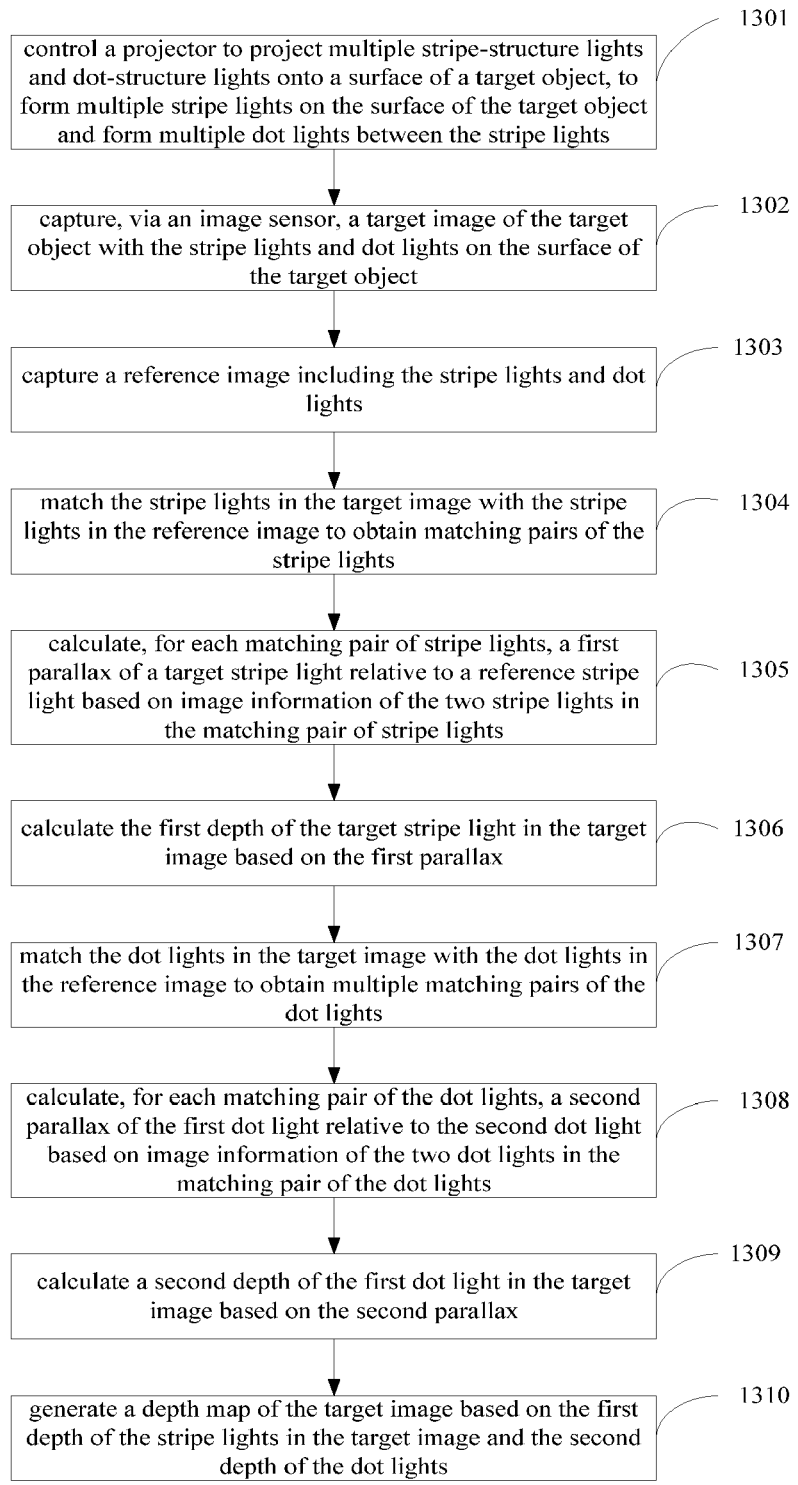
FIG. 13 is a flowchart showing a method for processing data provided according to Embodiment 12 of the invention.

FIG. 13 is a flow chart for a method for processing data provided according to another embodiment of the invention. The method is applied to an electronic device, where the electronic device includes at least an image sensor and a projector. For example, the electronic device may be a depth camera based on structured light, or other electronic devices with camera and structure light emitter. The method includes the steps from Step 1301 to Step 1310.

Step 1301 is to control a projector to project multiple stripe-structure lights and dot-structure lights onto a surface of a target object, to form multiple stripe lights on the surface of the target object and form multiple dot lights between the stripe lights.

Step 1302 is to capture, via an image sensor, a target image of the target object with the stripe lights and dot lights on the surface of the target object.

Step 1303 is to capture a reference image including the stripe lights and dot lights.

The operation process in Step 1301 to Step 1303 may refer to the descriptions in the foregoing embodiments, and detailed description thereof is omitted herein.

Step 1304 is to match the stripe lights in the target image with the stripe lights in the reference image to obtain matching pairs of the stripe lights.

Each matching pair of the stripe lights includes a stripe light in the target image and a stripe light in the reference image.

To determine a corresponding relation between the stripe light in the target image and the stripe light in the reference image, it is needed to perform a matching for the stripe lights. The two stripe lights in the matching pair of the stripe lights are the matched stripe lights in the target and the reference image respectively.

Herein, the stripe light of the matching pair in the target image is called target striation, and the stripe light of the matching pair in the reference image is called reference striation.

In the process of matching the stripe light in the target image and the stripe lights in the reference image, any conventional method for matching stripe light may be adopted.

Optionally, the stripe lights in the target image may be numbered in sequence; meanwhile the stripe lights in the reference image may be numbered in sequence. For example, the stripe lights may be numbered from left to right. The matched pairs of the stripe lights may be determined based on the numbers of the stripe lights in the target image and reference image.

Alternatively, in a case that there exists any distorted stripe light in the target image, the sections of the divided stripe light may be connected first. An error may occur in the process of connecting, such as connecting the sections of a stripe light belonging to different stripe lights. In that case, the connection error of the sections of the stripe lights may be corrected based on the numbers of the stripe lights, such that the sections of the stripe lights belonging to a same number may be connected. For example, in a case that the stripe light of the target image are numbered from left to right, and the upper and lower parts of the stripe lights are also numbered; in a case that the fourth stripe light from left to right are divided, and the upper part of the stripe light is determined to belong to the fourth stripe light, and then the fourth stripe light from left to right may be searched from the lower part of the stripe light, such that the stripe light needed to be connected may be determined exactly.

Step 1305 is to calculate, for each matching pair of stripe lights, a first parallax of a target stripe light relative to a reference stripe light based on image information of the two stripe lights in the matching pair of stripe lights.

The image information includes at least the positions of the stripe lights. The parallax of the target stripe light relative to the reference stripe light is calculated based on the position of the target stripe light in the target image and the position of the reference stripe light in the reference stripe light.

Herein, the parallax of the target stripe light relative to the reference stripe light is called the first parallax.

In the process of calculating, for each matching pair of stripe lights, a first parallax of a target stripe light relative to a reference stripe light based on image information of the two stripe lights in the matching pair of stripe lights, any conventional method for calculating parallax may be adopted, and detailed description thereof is omitted herein.

Step 1306 is to calculate the first depth of the target stripe light in the target image based on the first parallax.

The process of calculating a first depth of the target stripe light in the target image based on the parallax of the target stripe light relative to the reference stripe light may be similar to the conventional method.

Step 1307 is to match the dot lights in the target image with the dot lights in the reference image to obtain multiple matching pairs of the dot lights.

Each matching pair of the dot lights includes two dot lights, i.e., a first dot light in the target image and a second dot light in the reference image. By image matching technology, the dot lights in the target image and that in the reference image may be matched to obtain multiple matching pairs of the dot lights. Herein, the dot light of the matching pair in the target image is called the first dot light, and the dot light of the matching pair in the reference image is called the second dot light.

It may be understood that, the shapes of the dot lights are basically the same, the dot lights in the target image and reference image may be matched based on a configuration status of the dot light and other dot lights. In view of this, the dot lights projected by the projector may meet the following requirement, the requirement includes:

the distribution of the dot lights is not overlapped within a specific area, such that the distribution of the dot lights within a specific area of the reference image may not be overlapped, and the distribution of the dot lights within a specific area of the target image may not be overlapped, and the distribution of the dot lights with the specific area may be distinguished from the distribution of the dot lights out of the specific area. For example, a matching window may be set to be 3*3. The dot lights may be distributed randomly within the 3*3 window, but the distribution of the dot lights within any two 9*9 windows may not be overlapped.

Step 1308 is to calculate, for each matching pair of the dot lights, a second parallax of the first dot light relative to the second dot light based on image information of the two dot lights in the matching pair of the dot lights.

Step 1309 is to calculate a second depth of the first dot light in the target image based on the second parallax.

Herein, a parallax of the first dot light relative to the second dot light in the reference image is called second parallax.

In the process of calculating a parallax of the first dot light relative to the second dot light in the matching pair of the dot lights, any conventional method for calculating parallax may be adopted, and that is not restricted herein. Correspondingly, in the process of calculate a second depth of the first dot light in the target image based on the parallax of first dot light relative to the second parallax, any conventional method for calculating depth based on parallax may be adopted.

Step 1310 is to generate a depth map of the target image based on the first depth of the stripe lights in the target image and the second depth of the dot lights.

The process of generating the depth map may refer to the descriptions in the foregoing embodiments, and detailed description thereof is omitted herein.

Optionally, in an embodiment of the invention, the process of matching the dot lights in the target image and the dot lights in the reference image may include the following steps:

determining, for any adjacent first target stripe light and second target stripe light in the target image, a first reference stripe light and a second reference stripe light matched respectively with the first target stripe light and the second target stripe light in the reference image. Alternatively, the matched matching pair of the stripe lights may be determined directly in a case Step 1304 is performed, and then the first reference stripe light and the second reference stripe light matched respectively with the first target stripe light and the second target stripe light in the reference image may be determined.

For a target dot light between the first target stripe light and the second target stripe light in the target image, a matched reference dot light from the dot lights between the first reference stripe light and the second reference stripe light in the reference image may be obtained, and then a matching pair of the dot lights may be obtained.

That is to say, in the process of matching the dot lights, the dot light between any two adjacent target stripe lights in the target image may be obtained by matching with the dot lights between the two reference stripe lights in the reference image corresponding to the two adjacent target stripe lights. For example, as shown in FIG. 12, supposing that the first stripe light and the second stripe light from left to right are matched with the first stripe light and the second stripe light from left to right in the reference image shown in FIG. 12, such that the target dot lights of the first target stripe light and the second target stripe light may be matched with the dot lights between the first and the second reference stripe lights, and then a reference dot light matched with the target dot light may be obtained.

Therefore, in the process of matching the dot lights in the target image with the dot lights in the reference image, the data calculation amount may be large in a case that each time of matching the dot lights in the target image, the dot lights in the reference image may be calculated in sequence. Therefore, in a case that a corresponding relation of the stripe lights is adopted, and the dot lights between the two adjacent stripe lights with a matching relation in the two images are matched in sequence, and then it is not need to perform the matching calculation for all the dot lights in the reference image in each time of matching, thereby reducing the amount of matching calculation and ensuring a real-time requirement.

Optionally, in any one of the foregoing embodiments, the process of calculating the first depth of each stripe light in the target image may include determining a central position of each stripe light in a case that each stripe light in the target image is positioned and calculating the first depth of the center of each stripe light in the target image. For example, as shown in FIG. 12, each stripe light is arranged in the vertical direction, and each stripe light has a horizontal width. To make the calculation more accurate, a central point in the vertical direction may be determined, such that a central position of each stripe light in the vertical direction may be obtained, and a depth of the central position of the stripe light may be calculated.

Embodiment 13

Figure 14:
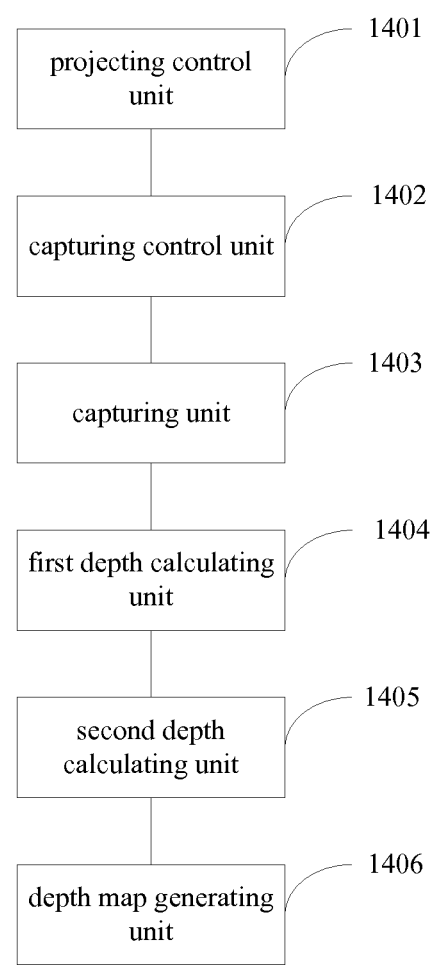
FIG. 14 is a schematic structure diagram of an apparatus for processing data provided according to Embodiment 13 of the invention.

Corresponding to the method for processing data, an apparatus for processing data is further provided according to the embodiment of the invention. The apparatus for processing data is shown in FIG. 14, which may be applied to an electronic device, where the electronic device includes at least an image sensor and a projector. The apparatus for processing data includes:

a projecting control unit 1401, configured to control a projector to project multiple stripe-structure lights and dot-structure lights onto a surface of a target object, to form multiple stripe lights on the surface of the target object and form multiple dot lights between the stripe lights;

a capturing control unit 1402, configured to capture, via an image sensor, a target image of the target object with the stripe lights and dot lights on the surface of the target object;

a capturing unit 1403, configured to capture a reference image including the stripe lights and dot lights;

a first depth calculating unit 1404, configured to calculate a first depth of each stripe lights in the target image based on image information of the stripe light in the reference image and the image information of the stripe light in the target image;

a second depth calculating unit 1405, configured to calculate a second depth of each dot light in the target image based on image information of the dot light in the reference image and image information of the dot light in the target image; and a depth map generating unit 1406, configured to generate a depth map of the target image based on the first depths of the stripe lights and the second depths of the dot lights in the target image.

Optionally, the first depth calculating unit 1304 includes:

a central depth calculating unit, configured to calculate the first depth of a center of each stripe light in the target image based on the image information of the stripe lights in the reference image and target image.

Based on a depth calculating method, the first depth calculating unit includes:

a first matching unit, configured to match the stripe lights in the target image with the stripe lights in the reference image to obtain matching pairs of the stripe lights, where each matching pair of the stripe lights includes a target stripe light in the target image and a reference stripe light in the reference image;

a first parallax calculating unit, configured to calculate, for each matching pair of stripe lights, a first parallax of a target stripe light relative to a reference stripe light based on image information of the target stripe light and the reference stripe light in the matching pair of stripe lights;

a first depth calculating unit, configured to calculate a first depth of the target stripe light of the target image based on the first parallax.

Correspondingly, the second depth calculating unit may include:

a second matching unit, configured to match dot lights in the target image with dot lights in the reference image to obtain multiple matching pairs of the dot lights, where each matching pair of the dot lights includes a first dot light in the target image and a second dot light in the reference image;

a second parallax calculating unit, configured to calculate, for each matching pair of the dot lights, a second parallax of the first dot light relative to the second dot light based on image information of the first dot light and the second dot light in the matching pair of the dot lights; and a second depth calculating sub-unit, configured to calculate a second depth of the first dot light in the target image based on the second parallax.

Preferably, the second matching unit includes:

a stripe matching determining unit, configured to determine, for any adjacent first target stripe light and second target stripe light in the target image, a first reference stripe light and a second reference stripe light matched respectively with the first target stripe light and the second target stripe light in the reference image;

a second matching sub-unit, configured to obtain, for a target dot light between the first target stripe light and the second target stripe light in the target image, a matched reference dot light from the dot lights between the first reference stripe light and the second reference stripe light in the reference image, and obtain a matching pair of the dot lights.

Although the preferable embodiments of the invention are described, those skilled in the art may make other modifications and replacements on the embodiments after learning the inventive concept of the invention. Therefore, the preferable embodiments and the modifications thereof fall into the protection scope of the claims.

Obviously, the variation or replacement within the technical scope made by those skilled in the art may fall into the protection scope of the disclosure. Therefore, the protection scope of the disclosure may be subject to the protection scope of the claims.

The invention claimed is:

1. A method for processing data, comprising:
projecting a first structure light and a second structure light onto a surface of a target object, wherein the first structure light is a stripe-structure light;
capturing a first image comprising the target object;
detecting first image information corresponding to the first structure light in the first image, wherein the first image information is stripe image information;
detecting second image information corresponding to the second structure light in the first image; and
obtaining a depth of the target object based on the first image information and the second image information;
wherein one of following three conditions is met:
1) a width of the second structure light is different from a width of the first structure light;
wherein obtaining a depth of the target object based on the first image information and the second image information comprises:
obtaining a sequence and positions of the first structure lights and the second structure lights based on the first image information and the second image information; and
obtaining the depth of the target object based on the sequence and the positions of the first structure lights and the second structure lights;
wherein obtaining a sequence and positions of the first structure lights and the second structure lights based on the first image information and the second image information comprises:
recognizing, from the first image information and the second image information, primary stripe image information corresponding to the first structure light and reference stripe image information corresponding to the second structure light; and
determining the sequence of the primary stripe lights based on the reference stripe image information and the primary stripe image information and obtaining the positions of the primary stripe lights and the at least two reference stripe lights;
2) the second structure light is a centrosymmetric pattern light, and the centrosymmetric pattern are set at a same interval on a stripe of the first structure light, wherein the pattern is configured to recognize the first structure light, and the patterns of any two adjacent first structure lights are different;
3) the second structure light is a dot-structure light, the method further comprises: capturing a reference image comprising the stripe light and dot lights;
wherein projecting a first structure light and a second structure light onto a surface of a target object comprises:

forming a plurality of stripe lights on the surface of the target object and forming a plurality of dot lights between the stripe lights;

wherein obtaining a depth of the target object based on the first image information and the second image information comprises:

calculating a first depth of each stripe light in the first image based on image information of the each stripe light in the reference image and the image information of the each stripe light in the first image;

calculating a second depth of each dot light in the first image based on image information of the each dot light in the reference image and the image information of the each dot light in the first image; and obtaining a depth of the target object based on the first depth of the each stripe light in the first image and the second depth of the each dot light in the first image.

2. The method according to claim 1, wherein the width of the second structure light is different from the width of the first structure light, in a case that the at least two reference stripe lights comprise M first reference stripe lights and N second reference stripe lights, the first reference stripe lights and the second reference stripe lights have different widths, and M and N are integers greater than or be equal to 1, obtaining a sequence and positions of the first structure lights and the second structure lights based on the first image information and the second image information comprises:

recognizing, from the first image information and the second image information, the primary strip image information corresponding to the primary stripe lights, first reference stripe image information corresponding to the M first reference stripe lights and second reference stripe image information corresponding to the N second reference stripe lights.

3. The method according to claim 2, wherein obtaining the sequence of the primary stripe lights based on the reference stripe image information and the primary stripe information comprises:

determining a sequence of the second reference stripe lights based on the first reference stripe image information; and determining the sequence of the primary stripe lights based on the second reference stripe image information.

4. The method according to claim 1, wherein the second structure light is a dot-structure light, the calculating a first depth of each stripe light in the first image comprises:

calculating the first depth of a center of the each stripe light in the first image.

5. The method according to claim 1, wherein the second structure light is a dot-structure light, the calculating a first depth of each stripe light in the first image based on image information of the each stripe light in the reference image and the image information of each stripe light in the first image comprises:

matching the each stripe light in the first image with the each stripe light in the reference image to obtain a plurality of matching pairs of stripe lights, wherein each of the matching pairs of the stripe lights comprises a target stripe light in the first image and a reference stripe light in the reference image;

calculating, for each of the matching pairs of stripe lights, a first parallax of the target stripe light relative to the reference stripe light based on the image information of the target stripe light and the reference stripe light in the matching pair of stripe lights; and calculating the first depth of the target stripe light in the first image based on the first parallax.

6. The method according to claim 1, wherein the second structure light is a dot-structure light, the calculating a second depth of each dot light in the first image based on image information of the each dot light in the reference image and the image information of the each dot light in the first image comprises:

matching the each dot light in the first image with the each dot light in the reference image to obtain a plurality of matching pairs of the dot lights, wherein each of the matching pairs of the dot lights comprises a first dot light in the first image and a second dot light in the reference image;

calculating, for each of the matching pairs of the dot lights, a second parallax of the first dot light relative to the second dot light based on image information of the first dot light and the second dot lights in the matching pair of the dot lights; and calculating a second depth of the first dot light in the first image based on the second parallax.

7. The method according to claim 6, wherein matching the each dot light in the first image with the each dot light in the reference image comprises:

determining, for any adjacent first target stripe light and second target stripe light in the first image, a first reference stripe light and a second reference stripe light matched respectively with the first target stripe light and the second target stripe light in the reference image;

obtaining, for a target dot light between the first target stripe light and the second target stripe light in the first image, a matched reference dot light from the dot lights between the first reference stripe light and the second reference stripe light in the reference image and obtaining the matching pair of the dot lights.

8. An apparatus for processing data, comprising: a processor and a memory having a processor-executable instruction stored therein, and the instruction when executed by the processor, configure the processor to:

capture a first image comprising a target object in a case that a first structure light and a second structure lights are projected onto a surface of the target object;

detect first image information corresponding to the first structure light in the first image and detect second image information corresponding to the second structure light in the first image, wherein the first image information is stripe image information; and obtain a depth of the target object based on the first image information and the second image information;

wherein one of following two conditions is met:

1) width of the second structure light is different from a width of the first structure light, the processor is configured to:

recognize, from the first image information and the second image information, primary stripe image information corresponding to the first structure light and reference stripe image information corresponding to the second structure light;

determine the sequence of the primary stripe lights based on the reference stripe image information and the primary stripe image information and obtain the positions of the primary stripe lights and the at least two reference stripe lights; and obtain the depth of the target object based on the sequence and the positions of the first structure lights and the second structure lights;

2) the second structure light is a dot-structure light, the processor is further configured to capture a reference image comprising the stripe lights and dot lights;

the processor is configured to calculate a first depth of stripe light in the first image based on image information of the each stripe light in the reference image and the image information of the each stripe light in the first image;

calculate a second depth of each dot light in the first image based on image information of the each dot light in the reference image and the image information of the each dot light in the first image; and obtain a depth of the target object based on the first depth of the each stripe light in the first image and the second depth of the each dot light in the first image.

9. The apparatus according to claim 8, wherein the second structure light is a dot-structure light, the processor is configured to:

calculate the first depth of a center of the each stripe light in the first image based on the image information of the stripe light in the reference image and in the first image.

10. The apparatus according to claim 8, wherein the second structure light is a dot-structure light, the processor is configured to:

match the each stripe light in the first image with the each stripe light in the reference image to obtain a plurality of matching pairs of stripe lights, wherein each of the matching pairs of the stripe lights comprises a target stripe light in the first image and a reference stripe light in the reference image;

calculate, for each of the matching pairs of stripe lights, a first parallax of the target stripe light relative to the reference stripe light based on the image information of the target stripe light and the reference stripe light in the matching pair of stripe lights; and calculate a first depth of the target stripe light in the first image based on the first parallax.

11. The apparatus according to claim 8, wherein the second structure light is a dot-structure light, the processor is configured to:

match each dot light in the first image with the each dot light in the reference image to obtain a plurality of matching pairs of the dot lights, wherein each of the matching pairs of the dot lights comprises a first dot light in the first image and a second dot light in the reference image;

calculate, for each of the matching pairs of the dot lights, a second parallax of the first dot light relative to the second dot light based on image information of the first dot light and the second dot light in the matching pair of the dot lights; and calculate a second depth of the first dot light in the first image based on the second parallax.

12. The apparatus according to claim 11, wherein the second matching unit comprises:

a stripe matching determining unit, configured to determine, for any adjacent first target stripe light and second target stripe light in the first image, a first reference stripe light and a second reference stripe light matched respectively with the first target stripe light and the second target stripe light in the reference image;

a second matching sub-unit, configured to obtain, for a target dot light between the first target stripe light and the second target stripe light in the first image, a matched reference dot light from the dot lights between the first reference stripe light and the second reference stripe light in the reference image, and obtain the matching pair of the dot lights.

\* \* \* \* \*